United States Patent
Lee et al.

[19]

[11] Patent Number: 5,984,632
[45] Date of Patent: Nov. 16, 1999

[54] MOTOR FAN FOR A CLEANING APPARATUS

[75] Inventors: Nam-Seon Lee, Kwangju; Jong-Soo Choi, Taejeon; Kie-Yong Lee, Kwangju, all of Rep. of Korea

[73] Assignee: Kwangju Electronics Co., Ltd., Kwangju, Rep. of Korea

[21] Appl. No.: 08/905,711

[22] Filed: Aug. 5, 1997

[30] Foreign Application Priority Data

Aug. 12, 1996 [KR] Rep. of Korea ................ 96-24196 U
Aug. 12, 1996 [KR] Rep. of Korea ................ 96-24197 U
Sep. 10, 1996 [KR] Rep. of Korea ................ 96-28751 U
Sep. 10, 1996 [KR] Rep. of Korea ................ 96-28752 U

[51] Int. Cl.$^6$ .................................................. F04D 29/28
[52] U.S. Cl. ................ 415/206; 416/186 R; 416/188; 416/195; 416/229 R; 416/244 R; 403/263; 403/326
[58] Field of Search ................ 415/206; 416/186 R, 416/188, 189, 192, 194, 195, 224, 229 R, 244 R, 244 A; 403/260, 263, 359, 326, 384

[56] References Cited

U.S. PATENT DOCUMENTS

| 390,615 | 10/1888 | Nye | 403/359 |
| 2,443,688 | 6/1948 | McFarland | 416/244 R |
| 3,131,956 | 5/1964 | Bailey | 416/244 R |
| 3,228,482 | 1/1966 | Bunyan | 416/244 R |
| 3,388,749 | 6/1968 | Woods et al. | 416/229 R |
| 4,428,717 | 1/1984 | Catterfeld | 416/186 R |
| 4,462,757 | 7/1984 | Uemura | 416/244 R |

FOREIGN PATENT DOCUMENTS

| 500425 | 3/1920 | France | 416/224 |
| 528068 | 11/1921 | France | 416/244 R |
| 1309366 | 10/1962 | France | 416/186 R |
| 1428268 | 2/1969 | Germany | 416/244 R |
| 2610362 | 9/1977 | Germany | 416/224 |
| 2-140495 | 5/1990 | Japan | 416/224 |
| 655880 | 8/1951 | United Kingdom | 416/244 A |

*Primary Examiner*—Christopher Verdier
*Attorney, Agent, or Firm*—Perman & Green, LLP

[57] ABSTRACT

A motor fan for a cleaning apparatus that creates the suction caused by a rotor in a suction device mounted in the cleaning apparatus such that foreign materials are drawn therein has a fan member coupled to the rotor and is provided with a plurality of curved fins thereon and which fins cause the air in a collection compartment to pass through a suction inlet by the suction when the rotor is rotated, and to discharge the sucked air outside a body through outlets and an exhaust outlet. A reinforcing member is provided and is closely engaged with a rear surface of the fan member, and which reinforcing member insertedly receives a shaft of the suction device and firmly is tightened by a nut. The reinforcing member is provided with a hub and a hole is provided in the hub for mounting the reinforcing member on a screw portion of the shaft, and further has a front surface provided with a plurality of bosses thereon, and the bosses are such that the reinforcing member is not separated from the fan member when the fan spins at high speed.

4 Claims, 8 Drawing Sheets

MOTOR FAN FOR A CLEANING APPARATUS

BACKGROUND OF THE INVENTION

1. Field of the Invention

The present invention relates to a motor fan for a cleaning apparatus, and more particularly to the motor fan whose deformation can be prevented, thereby providing the improved reliability and suction efficiency of the fan, and further, the motor efficiency being guaranteed even if any gap between fins on the fan and a motor housing is not adjusted.

2. Description of the Prior Art

Generally, there are now provided various types of a cleaning apparatus adopted to clean a room by sucking the dirt and dust through the suction created by a driving motor mounted in a main body of the cleaning apparatus.

As shown in FIGS. 1 and 2, the cleaning apparatus includes a main body 1, a dust collection compartment 5, a driving compartment 7, and a suction hose 4. The main body 1 forming a general exterior appearance of the cleaning apparatus further includes a connecting portion 2 and an exhaust outlet 3. The dust collection compartment 5 has a dust collection bag 6 used for collecting dust and foreign materials sucked into the body 1. The driving compartment 7 includes sucking means 10 mounted therein through supporting member 8, for creating the suction. Finally, the suction hose 4 coupled to the body through the connecting portion 2 serves to guide the air flow containing the dirt and dust into the dust collection bag 6 during the operation of the cleaning apparatus.

Further, the sucking means 10 has lower and upper housings 11 and 17, both of which form a general appearance thereof. The lower housing 11 is provided with a rotor 12 therein, which is for creating the rotational force during an application of electric power thereto. The upper housing 17 coupled to the lower housing 11 is provided with a fan or impeller therein that creates the actual suction in the cleaning apparatus by the activated rotor 12. The upper housing 17 also has a suction inlet 18 generally positioned around a hub thereof and a plurality of air outlets 19 formed in an outer surface thereof.

Also, the rotational force from the rotor 12 is transmitted through a shaft 13 coupled thereto to the fan 100, in which the shaft 13 has one end portion to which a male screw 15 is integrally attached, together with a stepped portion 14 on said end portion.

Referring to FIGS. 3 and 4, one side of the fan 100 is provided with many curved fins 110 as integral parts of the fan 100, which cause the air in the dust collection compartment 5 to pass through the suction inlet 18 by the suction when the fan coupled to the rotor is rotated, and to discharge the sucked air outside the body 1 through the outlets 3 and exhaust outlet 19.

The fan 100 includes at central portion or hub thereof a groove 120 to be fitted into the stepped portion 14 and a through hole 130 contiguous to the groove 120, and for inserting the male screw 15.

The groove 120 and stepped portion 14 support a lower part of the fan 100, while an upper part of the fan 100 is assembled by using the screw. Then, nut 16 is used to tighten the screw 15.

However, such a configured fan has several problems. The fan 100 coupled to the shaft 13 only by nut 16 without a separate supporting means suffers from downward load applied thereto. With torque beyond a predetermined pressure being loaded to nut 16 for fastening, heat is generated during rotation of the fan 100 and a supporting intensity is lowered accordingly. This causes deformation being bent toward the curved fins, which damages the fan 100 and reduces a suction efficiency and reliability.

Further, it is generally designed such that the curved fins 100 are spaced a constant interval from a motor cover 24 assembled with the upper housing 17. However, a satisfactory adjustment of the required interval is substantially difficult, thereby causing the drawback that suction efficiency of t he motor is lowered.

SUMMARY OF THE INVENTION

Therefore, it is an object of the present invention to provide a motor fan for a cleaning apparatus, by which any deformation of the fan can be prevented, thereby providing the improved reliability and suction efficiency of the fan, and further, the motor efficiency is guaranteed even if any gap between fins on the fan and a motor housing is not adjusted.

The above objects are accomplished by a motor fan for a cleaning apparatus that creates the suction caused by a rotor in sucking means mounted in the cleaning apparatus such that foreign materials such as dust are sucked therein, the motor fan comprising: a fan member provided with a plurality of curved fins thereon, which cause the air in a collection compartment to pass through a suction inlet by the suction when the fan coupled to the rotor is rotated, and to discharge the sucked air outside a body through outlets and exhaust outlet; and a reinforcing member mounted into a central portion of the fan member for insertedly receiving a shaft of the sucking means and then firmly tighten by nut.

Further, according to the present invention, there is provided a motor fan for a cleaning apparatus that creates the suction caused by a rotor in sucking means mounted in the cleaning apparatus such that foreign materials such as dust are sucked therein, the motor fan comprising: a fan member provided with a plurality of curved fins thereon and which cause the air in a collection compartment to pass through a suction inlet by the suction when the fan coupled to the rotor is rotated, and to discharge the sucked air outside a body through outlets and exhaust outlet; and a reinforcing member closely engaged with a rear surface of the fan member, and which insertedly receives a shaft of sucking means and then firmly is tighten by nut.

Still further, according to the present invention, there is provided a motor fan for a cleaning apparatus that creates the suction caused by a rotor in sucking means mounted in the cleaning apparatus such that foreign materials such as dust are sucked therein, the motor fan comprising: a fan member provided with a plurality of curved fins thereon, which cause the air in a collection compartment to pass through a suction inlet by the suction when the fan coupled to a rotor is rotated, and to discharge the sucked air outside a body through outlets and exhaust outlet; and a reinforcing member made of aluminum, encompassing a rear peripheral portion of the fan member.

Still further, according to the present invention, there is provided a motor fan for a cleaning apparatus that creates the suction caused by a rotor in sucking means mounted in the cleaning apparatus such that foreign materials such as dust are sucked therein, the motor fan comprising: a fan member provided with a plurality of curved fins thereon, which cause the air in a collection compartment to pass through a suction inlet by the suction when the fan coupled to the rotor is rotated, and to discharge the sucked air outside a body through outlets and exhaust outlet; and a curved plate configured like a washer such that it is closely coupled to the fins of fan member by a plurality of fastening means.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

Figure 1:
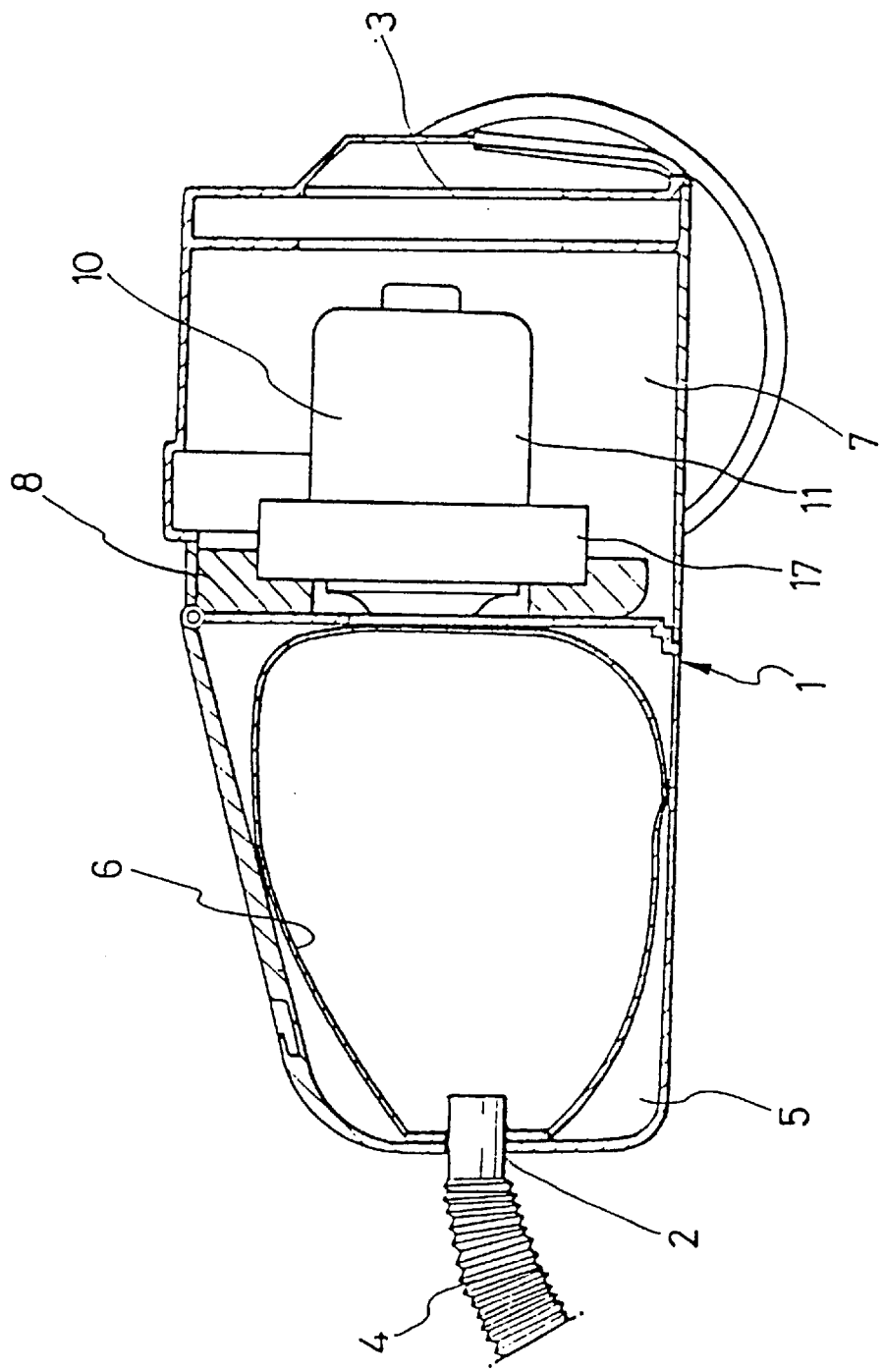
FIG. 1 shows a structure of a conventional cleaning apparatus.
Figure 2:
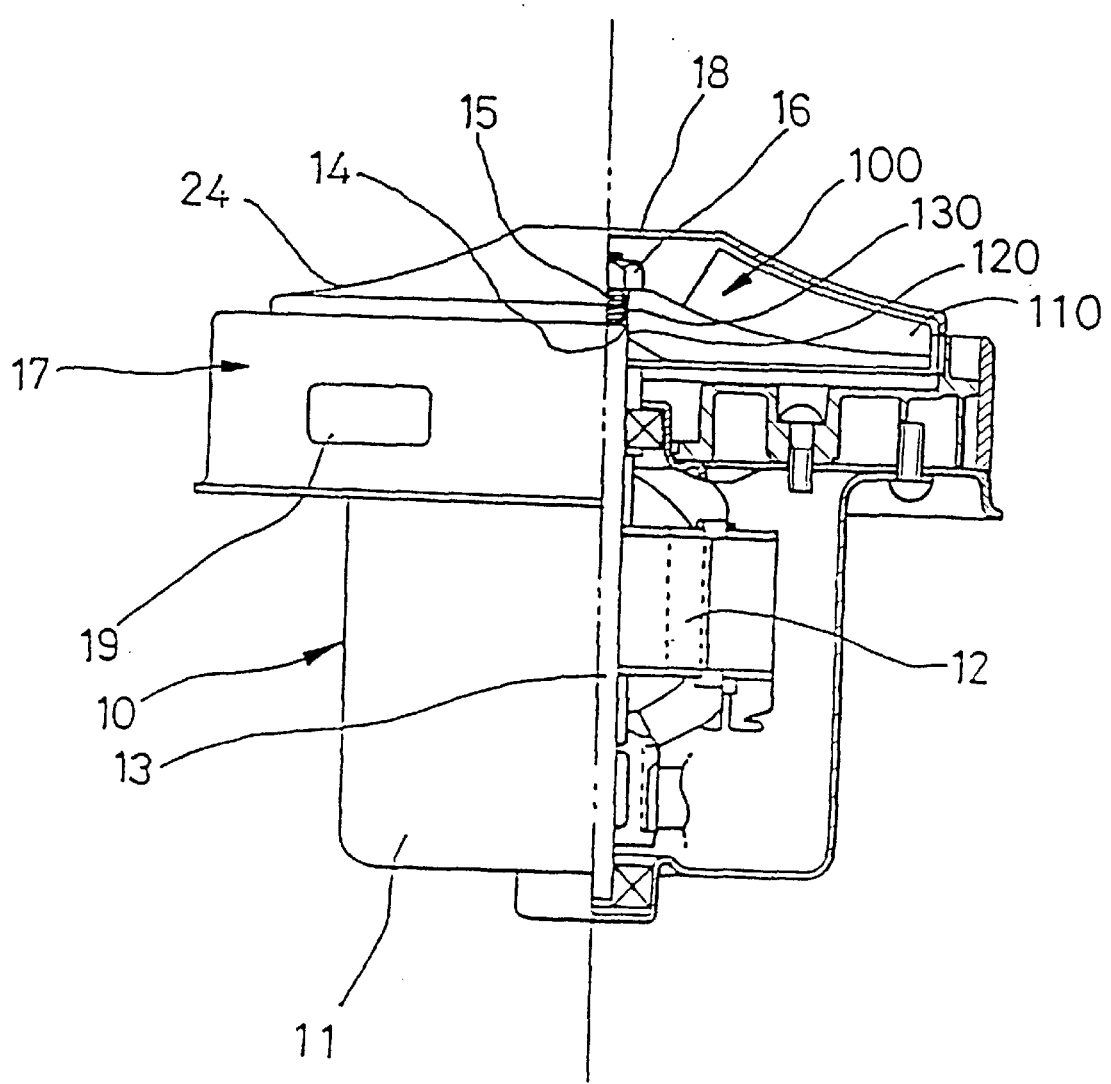
FIG. 2 shows a structure of sucking means with a conventional motor fan.
Figure 4:
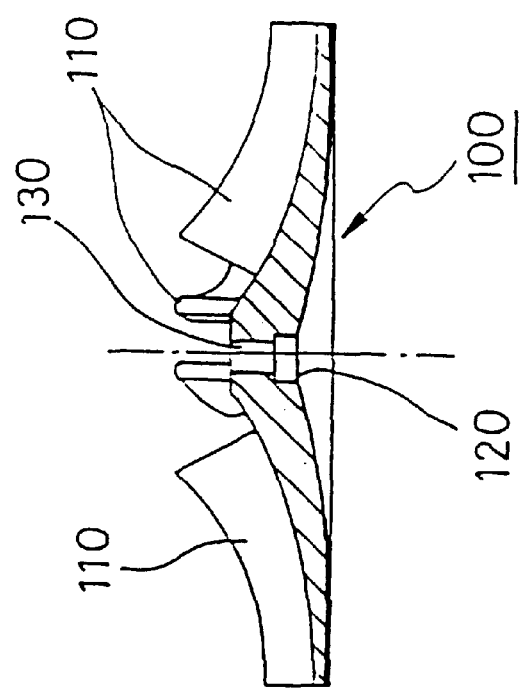
FIG. 4 shows a sectional view taken along I—I line in FIG. 3.
Figure 3:
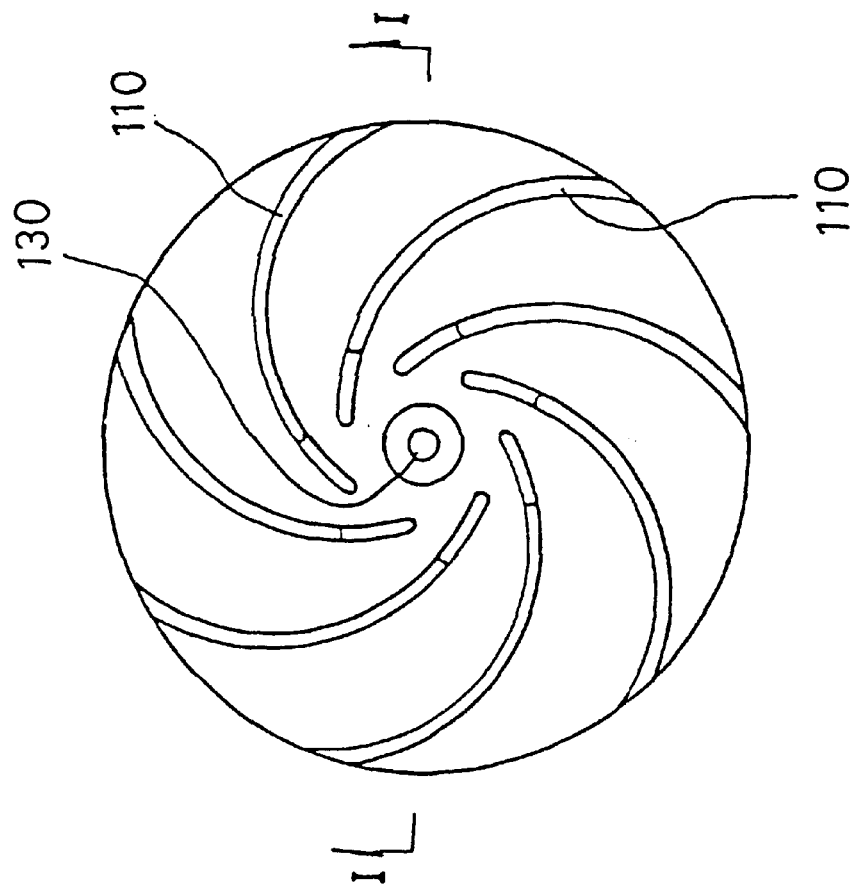
FIG. 3 shows a top view of the conventional motor fan.

A preferred first embodiment according to the present invention will now be described in detail in accordance with the accompanying drawings.

Referring to FIGS. 1 to 6, reference numeral 1 denotes a main body of a cleaning apparatus, to which a suction hose 4 for guiding air flow containing dust, etc. is connected through a connecting portion 2.

Further, the main body 1 is provided with a dust collection compartment 5 having therein a dust collecting bag 6 for collecting foreign substances guided thereto through the suction hose 4, and a driving compartment 7 having sucking means 10 installed thereto and to create the suction to collect foreign substances in the bag 6.

The sucking means 10 has lower and upper housings 11 and 17, both of which form a general appearance thereof. The lower housing 11 is provided with a rotor 12 therein, which is to create the rotational force during an application of electric power thereto. The upper housing 17 coupled to the lower housing 11 is provided with a fan or impeller therein that creates the actual suction in the cleaning apparatus when the rotor 12 is activated. The upper housing 17 also has a suction inlet 18 positioned at a central portion thereof and a plurality of outlets 19 formed in an outer surface thereof.

Also, the rotational force from the rotor 12 is transmitted through a shaft 13 coupled thereto to the fan, in which the shaft 13 has one end portion to which a male screw 15 is attached with a stepped portion 15 on the end portion.

The fan 200 includes a fan member 210 provided with many curved fins 211 thereon as integral parts of the fan 200, which cause the air in the collection compartment 5 to pass through the suction inlet 18 by the suction created when the fan coupled to the rotor is rotated, and to discharge the sucked air outside the body 1 through the outlets 3 and exhaust outlet 19. The fan 200 further includes a reinforcing member 220 inserted into a hub of the fan member 210, for insertedly receiving a shaft 13. Then, the reinforcing member 200 is firmly tighten by nut 16.

The central portion of the fan member 210 comprises a cylindrical, through hole 212 having upper section area slightly wider in diameter than lower section area. Further, the through hole 212 has vertical grooves 213 equiangular located along inner wall surface thereof with a predetermined depth.

The reinforcing member 220 includes a cylindrical body 221 whose dimension is identical with that of the through hole 212 and which serves like a wedge to be inserted in the through hole 212. A plurality of protrusions 222 outwardly extended from the body 221 are such that they are engaged with the respective vertical grooves 213. In addition, the reinforcing member 220 further includes a through hole 223 through which the screw 15 is inserted to be coupled each other and which is coaxial to the axis of the fan member 210, and a groove 224 with depth suitable for receiving the stepped portion 14 and with dimension large in diameter, compared with that of the through hole 223.

Meanwhile, reference numeral 8 denotes a supporting member for suppressing vibrations and noise occurring during the operation of the sucking means 10 and for maintaining the sealing of the dust collection compartment 5.

The operation and advantages of the cleaning apparatus having the fan in accordance with a first embodiment of the present invention will be discussed below.

When the cleaning apparatus is powered, electric power is applied to the sucking means 10 arranged in the driving compartment 7, thereby the rotor 12 is rotated in response thereto. Therefore, the fan is rotated which is coupled to the shaft transmitting the rotational force from the rotor 12.

The rotation of the fan 200 causes the curved fins to suck an air in the collection compartment and to discharge the air outside the main body 1.

Figure 6:
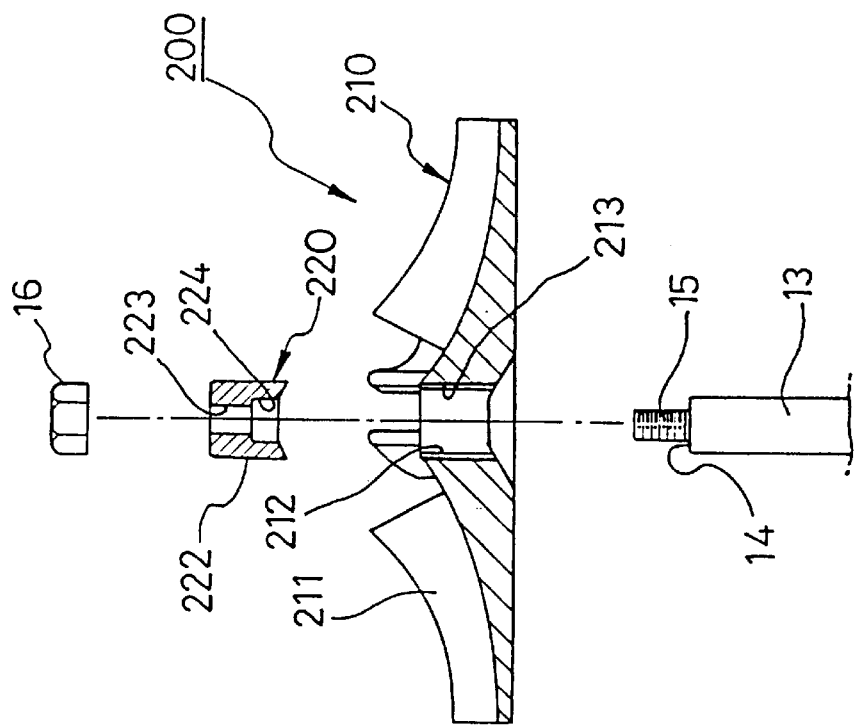
FIG. 6 shows an exploded, sectional view taken along II—II line in FIG. 5.
Figure 5:
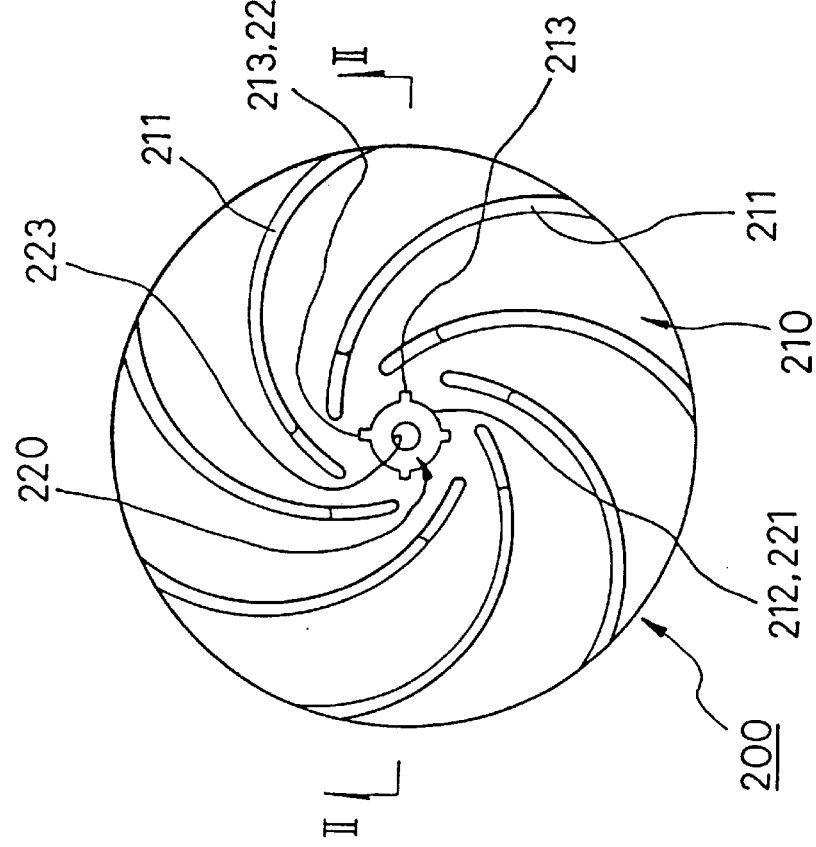
FIG. 5 shows a top view of a motor fan in accordance with a first embodiment of the present invention.

At this time, since the fan 200 is tightly mounted on the shaft by means of the reinforcing member 220 as shown in FIG. 6, the fan 200 provides a stable, constant performance such that it ensures to create the suction necessary for collecting the dirt and dust.

Moreover, when the dirt and dust in a room is sucked into the dust collection bag 6 through the suction hose 4 by the suction created from the rotating fan 200, the supporting member 8 suppresses loud noise, not to sound outside. Also, the fully closed state of the collection compartment 5 by the supporting member 8 improves suction efficiency, therefore the cleaning of the required room can be made easy.

Foreign substances in the dirty-air sucked into the collection bag 6 are collected, deposited in the collection bag 6 by the suction of the sucking means 10, and the thus cleaned air is discharged outside through the outlets 19 and exhaust outlet 3, which ensure to perform a better cleaning operation always by a constant suction.

Figure 7:
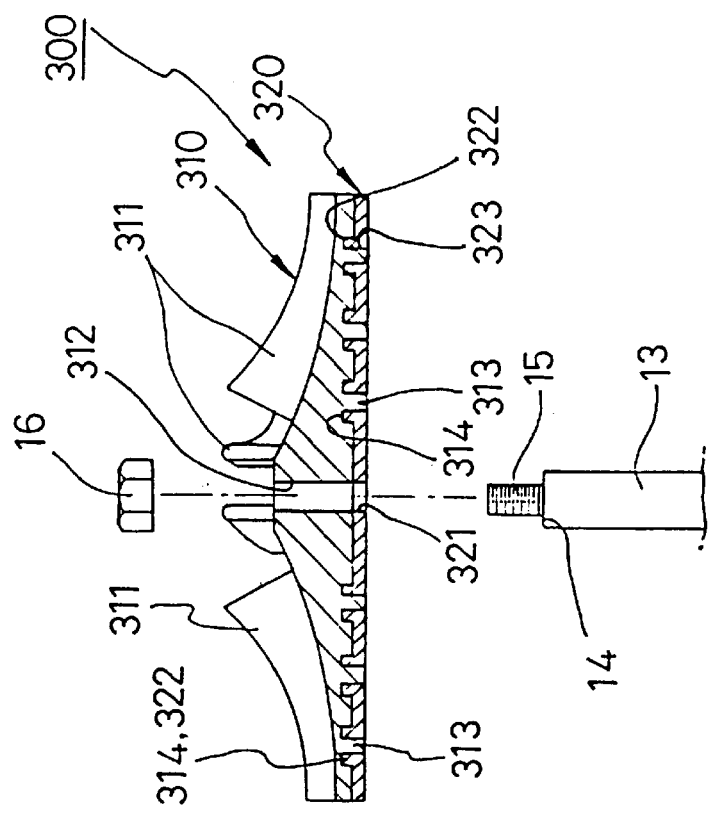
FIG. 7 shows a top view of a motor fan in accordance with a second embodiment of the present invention.
Figure 8:
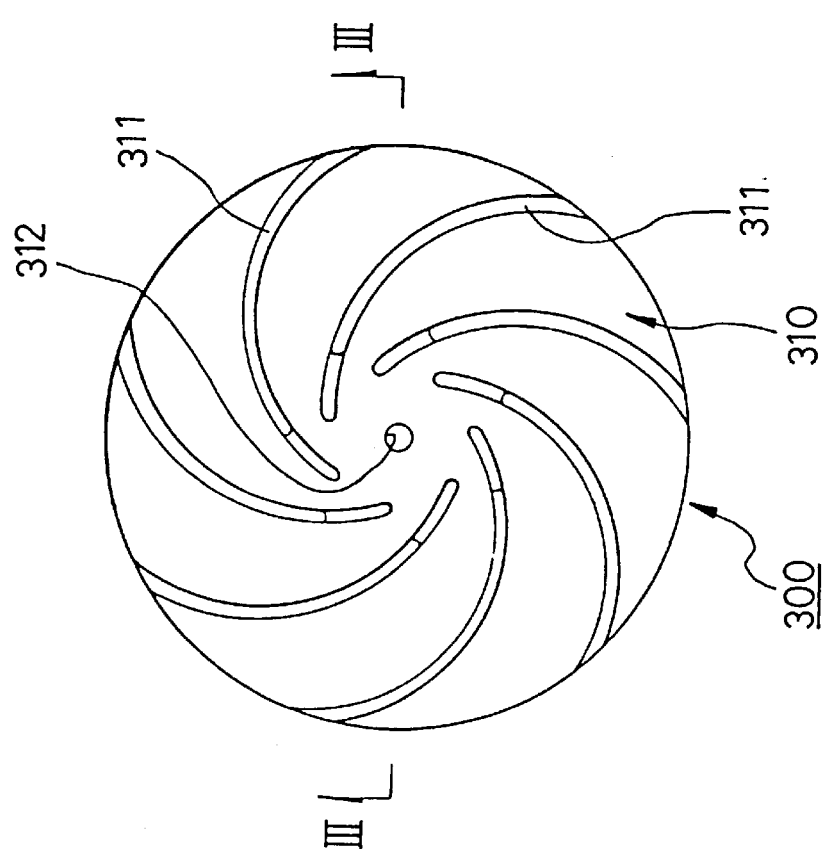
FIG. 8 shows a sectional view taken along III—III line in FIG. 7.
Figure 9:
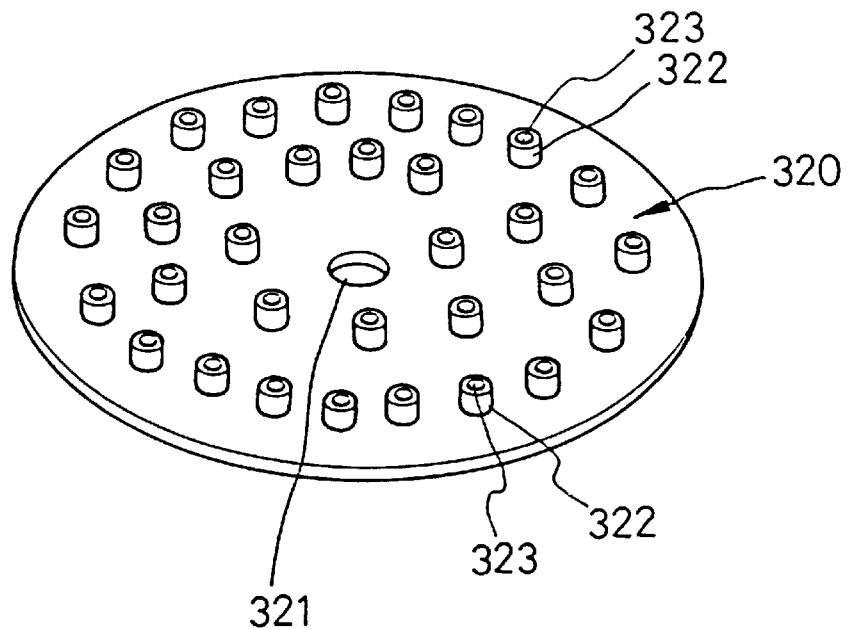
FIG. 9 shows a perspective view representing a first reinforcing member in FIG. 8.

Referring to FIGS. 7 to 9, a second embodiment according to the present invention will be described which is adopted to prevent any deformation of a fan 300.

For a fan 300 including: a fan member 310 provided with many curved fins 311 thereon as integral parts of the fan 300, which cause the air in the collection compartment 5 to pass through the suction inlet 18 by the suction when the fan coupled to the rotor is rotated, and to discharge the sucked air outside the body 1 through the outlets 19 and exhaust outlet 3; and a reinforcing member 320 mounted into a central portion of the fan member 310 for insertedly receiving a shaft 13 and then firmly tighten by nut 16, said fan member 310 has a through hole 312 at its hub for mounting it on the screw 15 of the motor shaft 13 and a plurality of protrusions 313 circularly arranged at rear surface thereof, wherein around the protrusions 313 there is provided a boss-seat groove 314 having a constant depth relative to the rear surface.

The reinforcing member 320 is also provided with a hole 321 at its hub for mounting it on the screw 15 of the motor shaft 13, and has a rear surface closely engaging with the stepped portion 14 of the shaft 13 and a front surface provided with a plurality of bosses 322 thereon. The purpose of the bosses 322 is such that the reinforcing member 320 is not separated from the fan member 310 when the fan spins at high speed. To this end, each boss 322 is seated into each boss-seat groove 314, and has inner hole 323 for receiving the protrusion 313.

In operation of the fan 300 according to the second preferred embodiment, the fan member 310 and reinforcing member 320 integrally coupled thereto prevent deformation of the fan 300 due to heat generated during a high speed spinning of the fan, also reinforce the coupling intensity therebetween. Also, since the bosses 322 integrally connected to the protrusions 313 are formed by burring processing, this advantageously prevents the separation from the fan member 310 during a high speed rotation of the fan 300.

Figure 10:
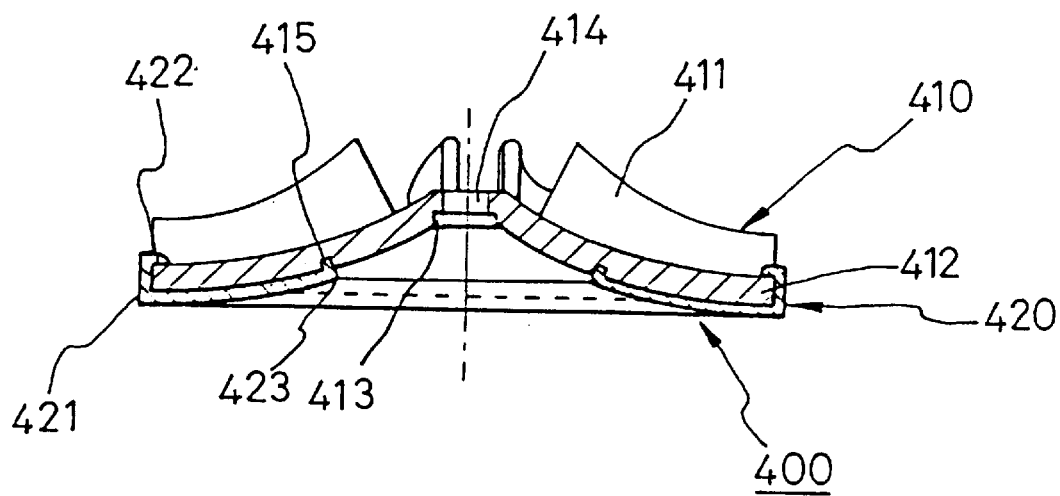
FIG. 10 shows a third embodiment in accordance with the present invention, representing a reinforced condition of a motor fan through a second reinforcing member.

FIG. 10 shows a sectional view of a fan 400 according to a third embodiment of the present invention.

For a fan 400 including: a fan member 410 provided with a plurality of curved fins 411 thereon as integral parts of the fan 400, which cause the air in the collection compartment 5 to pass through the suction inlet 18 by the suction when the fan coupled to the rotor rotates, and to discharge the sucked air outside the body 1 through the outlets 19 and exhaust outlet 3; and a reinforcing member 420 made of, for example, aluminum, for encompassing a rear peripheral portion 412 of the fan member 410, said fan member 410 has: a through hole 414 at its hub for mounting it on the screw 15 of the motor shaft 13, a groove 413 contiguous to the through hole 414, being closely engaged with the stepped portion 14 of the shaft 13; and a coupling groove shaped like a circular stripe at a predetermined location of the curved bottom surface of the fan member 410.

The reinforcing member 420 according to the preferred embodiment includes a reinforcing part 421 encompassing a rear peripheral portion 421 of the fan member 410, an upper pressing part 422 which closely adheres to an upper surface of the fan member 410, and a lower pressing part 423 which is inserted in a coupling groove 415 such that the part 423 is provided at lower edge of the reinforcing part 421 and then adhere thereto.

The operation of the third embodiment will be described below.

Because the rear peripheral portion 421 of the fan member 410 constituting the fan 400 is integrally provided with the reinforcing member 420 made of aluminum from which a deforming pressure opposite to an increasing pressure is advantageously caused, the problem that the fan 400 is deformed up due to heat and pressure generated when the fan spins at a high speed can be solved.

Since the upper and lower pressing parts 422, 423 of the reinforcing member 420 ensure to be seated at the rear peripheral portion 412, various parts are not separated from the fan 400 even if the fan is rotated at a higher speed.

Since the fan 400 is securely mounted on the motor shaft 13 and the reinforcing member 420 of aluminum material, which is selected for preventing deformation of the fan occurring when heat and pressure due to high spinning speed of the fan are applied thereto, is integrally coupling to the fan 400, this allows the fan 400 to be rotated at a constant speed without any deformation, thereby performing the clearing of the required place by a constant suction force.

Figure 11:
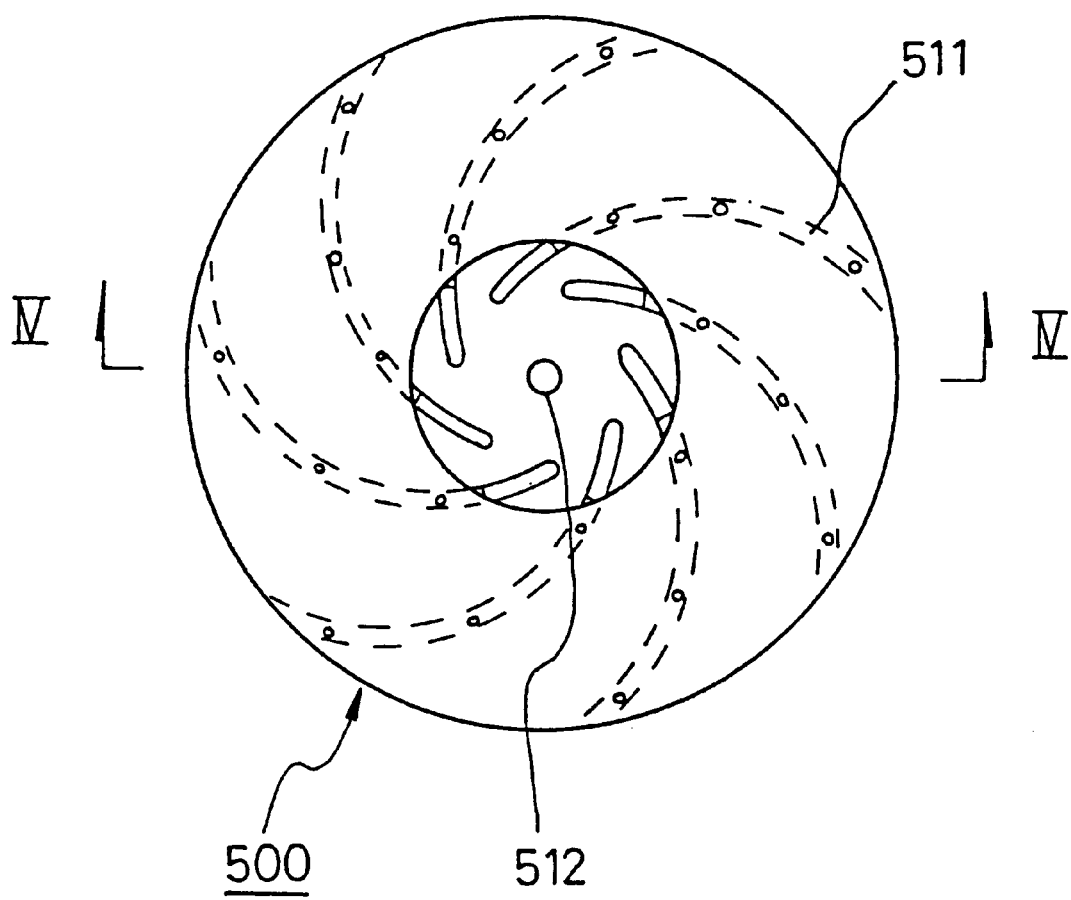
FIG. 11 shows a top view of a motor fan in accordance with a fourth embodiment of the present invention.
Figure 12:
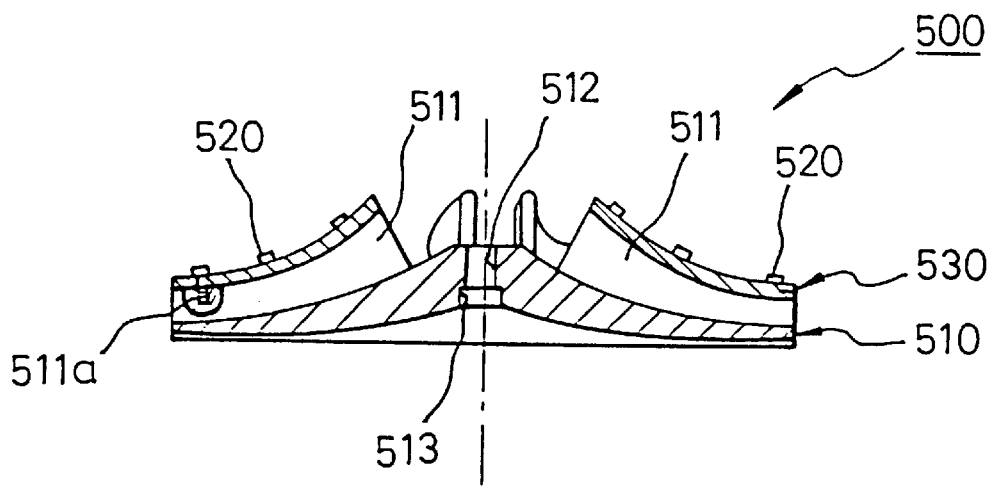
FIG. 12 shows a sectional view taken along IV—IV line in FIG. 11.
Figure 13:
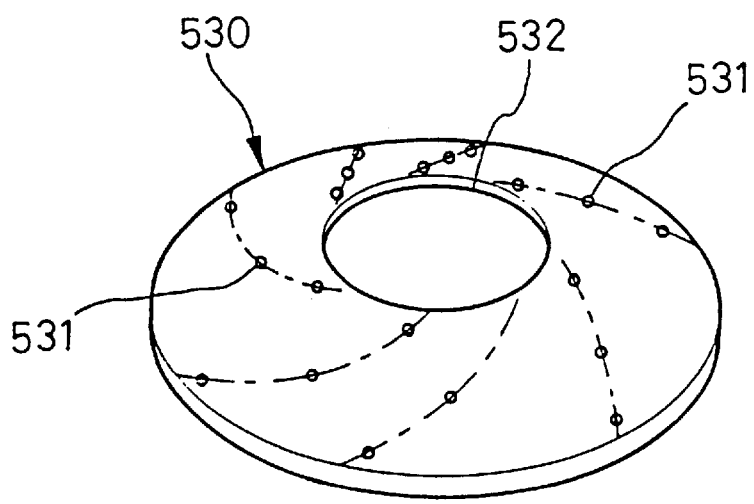
FIG. 13 shows a perspective view representing a plate in accordance with the fourth embodiment of the present invention.

FIGS. 11 to 13 shows a fan 500 according to a fourth embodiment of the present invention.

For a fan 500 including: a fan member 510 provided with a plurality of curved fins 511 thereon as integral parts of the fan 500, which cause the air in the collection compartment 5 to pass through the suction inlet 18 by the suction when the fan coupled to the rotor rotates, and to discharge the sucked air outside the body 1 through the outlets 19 and exhaust outlet 3; and a curved plate 530 configured like a washer such that it is closely coupled to the fins 511 of fan member 510 by a plurality of fastening means 520.

Each curved fin 511 of the fan 500 is provided with a plurality of holes 530 a positioned to correspond to the respective hole 531 in the plate 511 for fastening each other by means of the fastening means 520 therethrough.

Reference numeral 532 indicates a suction inlet through which the air passes, 512 denotes a through hole for mounting it on the screw 15 of the shaft 13. Reference numeral 513 denotes a groove of a constant depth suitable for receiving the stepped portion 14, whose diameter is designed to be larger than that of the through hole 223.

In operation, when the required power is supplied to the suction means 10 in the driving compartment 7, the rotor 12 spins at a high speed, whereby the fan 500 is rotated.

Rotation of the curved fins 511 on the fan 500 causes the air in the collection compartment 5 to be sucked through the suction inlet 18 and to discharge the air outside the main body 1 through the outlets 19 and exhaust outlet 3, at the same time. At this time, the firmly coupled condition of the fins 511 and plate 530 by the fastening means 520 further improves the suction force.

According to the present invention, deformation of the fan can be prevented, therefor there is provided the improved reliability and suction efficiency of the fan. Further, the motor efficiency is guaranteed even if any gap between the fins and the motor housing is not adjusted.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A motor fan for a cleaning apparatus that creates suction caused by a rotor in sucking means mounted in the cleaning apparatus such that foreign materials are drawn therein, the motor fan comprising:

a fan member coupled to the rotor and provided with a plurality of curved fins thereon and which fins cause air in a collection compartment to pass through a suction inlet by the suction when the rotor is rotated, and to discharge the sucked air outside a body through outlets and an exhaust outlet;

a reinforcing member closely engaged with a rear surface of the fan member, and said reinforcing member insertedly receiving a shaft of said sucking means and firmly tightened by a nut;

wherein said fan member comprises:
 a hub, a through hole in said hub for mounting said reinforcing member on a screw portion of the shaft;
 a plurality of protrusions circularly arranged at a rear surface of said fan member; and
 a boss-seat groove provided around the protrusions and having a constant depth relative to said rear surface.

2. A motor fan for a cleaning apparatus that creates suction caused by a rotor in sucking means mounted in the cleaning apparatus such that foreign materials are drawn therein, the motor fan comprising:

a fan member coupled to the rotor and provided with a plurality of curved fins thereon and which fins cause air in a collection compartment to pass through a suction inlet by the suction when the rotor is rotated, and to discharge the sucked air outside a body through outlets and an exhaust outlet;

a reinforcing member closely engaged with a rear surface of the fan member, and said reinforcing member insertedly receiving a shaft of said sucking means and firmly tightened by a nut;

wherein said reinforcing member is provided with a hub and a hole is provided in said hub for mounting said reinforcing member on a screw portion of the shaft, and further has a front surface provided with a plurality of bosses thereon, and wherein the bosses are such that the reinforcing member is not separated from the fan member when the fan spins at high speed, and wherein each boss is seated into a boss-seat groove in said fan and has an inner hole for receiving a protrusion of said reinforcing member.

3. A motor fan for a cleaning apparatus that creates suction caused by a rotor in sucking means mounted in the cleaning apparatus such that foreign materials are sucked therein, the motor fan comprising:

a fan member provided with a plurality of curved fins thereon, which cause air in a collection compartment to pass through a suction inlet by the suction when the fan coupled to a rotor is rotated, and to discharge the sucked air outside a body through outlets and an exhaust outlet; and a reinforcing member made of aluminum, encompassing a rear peripheral portion of the fan member;

wherein said fan member comprises:
 a hub and a hole in said hub for mounting said fan member on a screw portion of the shaft;
 a groove contiguous to the through hole, being closely engaged with a stepped portion of the shaft; and
 a coupling groove shaped like a circular stripe at a predetermined location on a curved bottom surface of the fan member.

4. A motor fan for a cleaning apparatus that creates suction caused by a rotor in sucking means mounted in the cleaning apparatus such that foreign materials are sucked therein, the motor fan comprising:

a fan member provided with a plurality of curved fins thereon, which cause air in a collection compartment to pass through a suction inlet by the suction when the fan coupled to a rotor is rotated, and to discharge the sucked air outside a body through outlets and an exhaust outlet; and a reinforcing member made of aluminum, encompassing a rear peripheral portion of the fan member;

wherein said reinforcing member comprises:
 a reinforcing part encompassing said rear peripheral portion of the fan member;
 an upper pressing part which closely adheres to an upper surface of the fan member; and
 a lower pressing part which is inserted in a coupling groove such that the lower pressing part is provided at a lower edge of the reinforcing part and is adhered to said lower pressing part.

* * * * *